Figure 1:
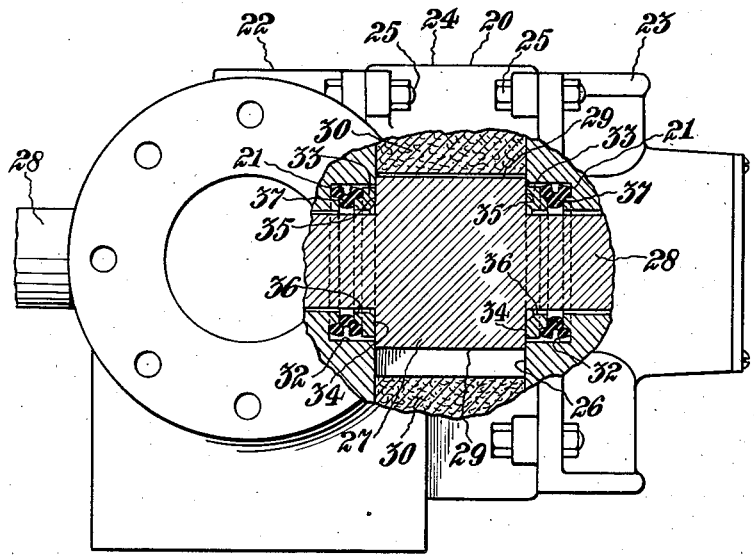

Jan. 20, 1942.  F. B. DOYLE  2,270,651

SEALING DEVICE

Filed March 21, 1941

INVENTOR
Frank B. Doyle.
BY
HIS ATTORNEY.

Patented Jan. 20, 1942

2,270,651

UNITED STATES PATENT OFFICE 2,270,651

SEALING DEVICE

Frank B. Doyle, Phillipsburg, N. J., assignor to Ingersoll-Rand Company, New York, N. Y., a corporation of New Jersey Application March 21, 1941, Serial No. 384,454

2 Claims. (Cl. 286—11)

This invention relates to a sealing device for a rotary member, as for example the rotor of a pump.

More specifically, the invention relates to that class of sealing devices commonly termed mechanical seals in which end surfaces of relatively rotary and stationary members cooperate to perform the sealing function. The cooperating surfaces of the sealing members are initially constructed to provide ample sealing areas and the non-rotating component of the sealing device is subjected to a suitable pressure and capable of moving longitudinally of the rotary member to maintain an adequate sealing contact between the members.

One object of the invention is to effectively prevent the leakage of fluid along the cooperating surfaces of the rotary and stationary parts of the pump.

Another object is to assure a rugged sealing device comprising only a few parts of simplified design that may be maintained, and renewed when required, with a minimum of expense.

Other objects will be in part obvious and in part pointed out hereinafter.

Figure 2:
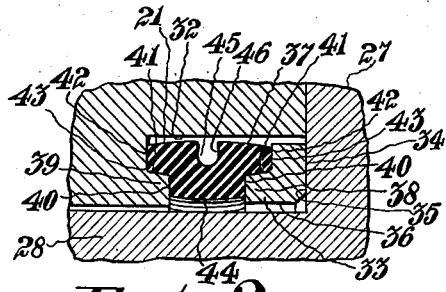
Figure 3:
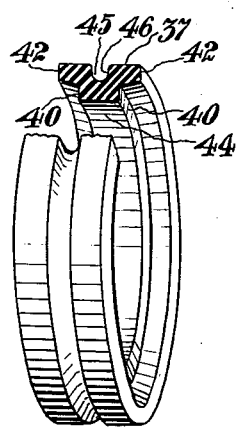
Figure 4:
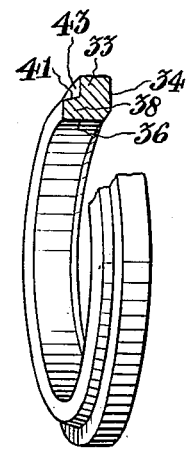

In the drawing accompanying this specification and in which similar reference numerals refer to similar parts:

Figure 1 is a side elevation, partly broken away, of a pump equipped with sealing devices constructed in accordance with the practice of the invention, Figure 2 is an enlarged view, in section, of the sealing device and portions of the elements wherewith it is associated, and Figures 3 and 4 are perspective views, partly broken away, of elements of the sealing device.

Referring more particularly to the drawing, 20 designates, in general, a pump and 21 a sealing device incorporated in the pump to prevent leakage of fluid from the casing to the atmosphere.

The pump is shown, for the sake of simplicity of illustration, as being of the rotary vane type. It comprises a pair of heads 22 and 23 and a cylinder 24 interposed between the heads and securely fastened thereto by bolts 25. The interior of the cylinder 24 constitutes a piston chamber 26 containing a rotor 27 having shaft portions 28 on opposite sides thereof extending through the heads 22 and 23, and in the rotor are slots 29 to receive, slidably, vanes 30 for impelling the fluid intended to be pumped.

In order to prevent the escape to the atmosphere, along the shaft portions 28, of such fluid as may find its way along the end surfaces of the rotor 27 suitable sealing devices are provided at the ends of the piston chamber 26 to cooperate with the ends of the rotor. The sealing devices 21 are arranged in sealing chambers 32 in the form of annular recesses in the inner ends of the heads 22 and 23 coaxial with and opening into the spaces occupied by the shaft portions 28.

Each sealing device comprises an annular sealing member 33 having a bearing surface 34 at one end to seat, in sealing engagement, against the adjacent end surfaces 35 of the rotor. The sealing member is of smaller diameter than the sealing chamber 32 so that, in the operative positions of the parts, there will be no contact between the sealing member 33 and the wall of the sealing chamber. The bore 36 in the sealing member through which the shaft portion 28 extends is also of sufficiently larger diameter than the shaft to prevent contact between the two.

The sealing member 33, as is customary in devices of this character, is preferably capable of a degree of endwise movement and in the present instance is urged toward the surface 35 by a ring 37 constructed of resilient material, as for example rubber. The ring 37 is interlocked with both the sealing member 33 and the head wherein it is arranged. To this end the sealing member 33 and the head containing it are provided, respectively, with opposed flanges 38 and 39 that extend into annular recesses 40 in the end surfaces of the ring 37.

The peripheral surfaces 41 of the flanges 38 and 39 are inclined somewhat toward the axis of the rotor and the flanges are so proportioned that the encircling portions of the ring 37 will be expanded somewhat to effect fluid tight joints between the flanges and the resilient ring.

In order to further assure adequate sealing engagement of the ring 37 with the parts to which it is attached, the end surfaces 42 of the portions of the ring 37 encircling the flanges seat against the adjacent surfaces 43 of the sealing member and the sealing chamber 32. The ring 37 is, moreover, provided with an internal flange 44 that lies between the flanges 38 and 39 and is in sealing contact with each to assure large sealing areas between the ring 37 and the flanges.

To the end that the flange 44 may exert a constant pressure against the sealing member 33 to press it against the rotor the said flange is made of somewhat greater width than the space between the flanges 38 and 39. Thus proportioned the material of the flange 44 will be displaced into the space between the inner surface of the flange and the surface of the shaft portion 28 and the flange will then constantly tend to urge the sealing member toward the rotor.

In order to assure a degree of yieldability, endwise, of the ring 37 said ring is provided with an annular groove 45. When, as in the present structure, the groove is located in the outer surface of the ring 37 its surfaces will be subjected to the pressure of the fluid in the sealing chamber 32. Thus, the pressure of the fluid acting against the inner side 46 of the groove will augment the pressure of the ring 37 to press the sealing member against the rotor. In certain structures it may be desirable, therefore, to use only a shallow groove to avoid pressing the sealing member excessively hard against the rotor. On the other hand, the groove may be of considerable depth to provide a large side surface 46 in order to maintain a seal against a heavy discharge pressure.

As will be readily apparent, upon reference to the drawing, the resilient ring 37 is of such proportions, diametrically, that spaces exist between its outer surface and the encircling wall of the chamber 32 as well as between the inner surface of the flange 44 and that of the shaft portion 28. The ring 37 is suspended entirely upon the flange 39 and holds the sealing member 33 free from contact with the wall of the chamber 32 and the shaft portion 28.

I claim:

1. In a sealing device, the combination of a casing having a sealing chamber for the fluid to be sealed and a rotor having a sealing surface, a sealing member encircling the rotor and seating against the sealing surface, opposed flanges on the casing and the sealing member, a peripheral surface on each flange inclined toward the axis of the rotor, a resilient ring, an annular groove in the resilient ring providing pressure surfaces against which the pressure of the fluid in the sealing chamber may act to hold the ring in fluid-tight engagement with the peripheral surfaces and press the sealing member against the sealing surface, and an internal flange on the resilient ring of greater width than the distance between the opposed flanges to press the sealing member against the sealing surface.

2. In a sealing device, the combination of a casing having a sealing chamber for the fluid to be sealed and a rotor having a sealing surface, a sealing member encircling the rotor and seating against the sealing surface, a peripheral surface on the casing inclined toward the axis of the rotor, a second peripheral surface on the sealing member inclined toward the axis of the rotor, a resilient ring in the chamber spaced with respect to the rotor and the peripheral surface of the chamber, an annular groove in the resilient ring to provide pressure surfaces against which the fluid pressure in the sealing chamber may act to hold the resilient ring in fluid-tight engagement with the peripheral surfaces and press the sealing member against the sealing surface, and an internal flange on the resilient ring compressed between the sealing member and the casing to press the sealing member against the sealing surface.

FRANK B. DOYLE.